(12) United States Patent
Weed et al.

(10) Patent No.: US 12,330,543 B2
(45) Date of Patent: Jun. 17, 2025

(54) ARM PAD FOR VEHICLE DOOR SILL

(71) Applicants: Donald Weed, Lake View Terrace, CA (US); Suzanne Weed, Lake View Terrace, CA (US)

(72) Inventors: Donald Weed, Lake View Terrace, CA (US); Suzanne Weed, Lake View Terrace, CA (US)

( * ) Notice: Subject to any disclaimer, the term of this patent is extended or adjusted under 35 U.S.C. 154(b) by 302 days.

(21) Appl. No.: 17/954,184

(22) Filed: Sep. 27, 2022

(65) Prior Publication Data

US 2024/0101007 A1    Mar. 28, 2024

(51) Int. Cl.
*B60N 2/75* (2018.01)

(52) U.S. Cl.
CPC ............. *B60N 2/783* (2018.02); *B60N 2/787* (2018.02)

(58) Field of Classification Search
CPC ........ B60N 2/783; B60N 2/753; B60N 2/787; B60R 2021/0293; A47C 20/023; A47C 7/546; A61G 5/125
USPC ....................................................... D12/421
See application file for complete search history.

(56) References Cited

U.S. PATENT DOCUMENTS

| | | | | |
|---|---|---|---|---|
| 2,709,620 A | * | 5/1955 | Tinsley | B60N 2/783 296/153 |
| 2,738,220 A | * | 3/1956 | Simmons | B60N 2/783 296/153 |
| 5,010,996 A | * | 4/1991 | Washburn | B60J 1/20 296/153 |
| 5,335,888 A | * | 8/1994 | Thomsen | A47B 21/0371 248/205.2 |
| 5,893,601 A | * | 4/1999 | Carlberg | B60N 2/783 296/153 |
| 5,934,754 A | * | 8/1999 | Raffa | B60N 2/783 297/392 |
| 6,981,735 B1 | * | 1/2006 | Stephens | B60N 2/753 296/153 |
| 2004/0017094 A1 | * | 1/2004 | Bruton | B60N 2/783 296/153 |

* cited by examiner

*Primary Examiner* — Daniel J Colilla

(57) ABSTRACT

An arm pad for a vehicle door sill is described. The arm pad includes a first layer of oblong material including a support material, the support material having a bend providing an angle or arcuate curve. The arm pad further includes second and third layers of oblong material including cushioning material disposed on either side of the support material, and covering material stitched together to cover the first, second, and third layers of oblong material. The bend of the support material runs longitudinally and off-center to provide a wide arm and a narrow arm on either side of the bend. The bend, wide arm, and narrow arm are dimensioned to fit over a door sill of a vehicle.

19 Claims, 14 Drawing Sheets

ARM PAD FOR VEHICLE DOOR SILL

FIELD

The present disclosure is directed to the field of transportation. More particularly, the present disclosure features an arm pad dimensioned and designed to fit on a vehicle door to allow a driver or passenger to extend and rest an arm comfortably on the arm pad.

BACKGROUND

Interior vehicle door panels house electrical wiring, control and/or locking mechanisms for windows, mirrors, and door locks, interior lights, audio speakers, and other internal components to provide functionalities present ubiquitously in modern vehicles. As such, the indoor panels are constructed with rigid materials such as hard plastic to protect these components. While built for durability, the rigid door panels are lacking in terms of ergonomic benefits to the driver or passengers of the vehicle.

SUMMARY

In general, the disclosure features an arm pad which includes a first layer of oblong material including a support material, the support material having a bend providing an angle or arcuate curve, second and third layers of oblong material including cushioning material disposed on either side of the support material, and covering material stitched together to cover the first, second, and third layers of oblong material. The bend of the support material runs longitudinally and off-center to provide a wide arm and a narrow arm disposed on either side of the bend, the bend, wide arm, and narrow arm dimensioned to fit over a door sill of a vehicle.

Features of the arm pad can include one or more or all of the following. The first layer of oblong material can be chosen from materials including metal, plastic, and reinforced cardboard. The second layer of oblong material can be chosen from foam materials including closed cell foam, memory foam, and high-density foam. The third layer of oblong material can be chosen from materials including cardboard. The covering material can be chosen from materials including leather, vinyl, and cloth. The covering material can be stitched together at a first seam and a second seam at a margin on an outer edge of the arm pad along a first and second side of the arm pad. A first side of the arm pad can include a margin, a rounded, bulky portion, and a seam disposed along an outer edge of the first side between the margin and the rounded, bulky portion. An opposing second side of the arm pad can have no rounded, bulky portion. The first side of the arm pad can be concave in shape and the opposing second side of the arm pad can be convex in shape. The second layer of oblong material can be a foam providing bulk to the rounded, bulky portion. The opposing second side of the arm pad can include a margin formed by a seam disposed along an outer edge of the opposing second side of the arm pad. The wide arm and the narrow arm can be disposed asymmetrically on either side of the bend. The wide arm can have corner regions which are more widened and broadly curved than opposing corner regions of the narrow arm. The bend can form an angle between the narrow arm and the wide arm in the range of 60 degrees to 175 degrees. The arm pad can be dimensioned to mount on a vehicle door sill such that the narrow arm can extend over a narrow door sill and the wide arm can extend over a door side, and the bend can span an area where the narrow door sill and door side meet. The arm pad can also be dimensioned to mount on a vehicle door sill such that the wide arm can extend over a wide door sill and the narrow arm can extend over a door side, and the bend can span an area where the wide door sill and door side meet. The arm pad can be flexible such that an angle provided by the bend of the support material is adjustable. The arm pad can be flexible and moldable when heated such that pressing the arm pad against a vehicle door sill when heated provides a custom fit for mounting the arm pad on a vehicle door sill.

It should be understood that the arm pad and its features are not to be considered limitations on the invention defined by the claims. The featured arm pad can be implemented in one or more ways using one or more features depicted in the drawings, described in the detailed description, and set forth in the claims.

BRIEF DESCRIPTION OF THE DRAWINGS

The accompanying drawings illustrate certain aspects and principles of the implementations set forth, and should not be construed as limiting.

FIGS. 15-16 show an arm pad implementation covering a narrow vehicle door sill and FIGS. 17-18 showing an arm pad implementation covering a wide vehicle door sill.

DETAILED DESCRIPTION

Reference will now be made in detail to various illustrative implementations. It is to be understood that the following discussion of the implementations is not intended to be limiting.

The present disclosure relates to an arm pad that is designed to be mounted on the door sill of a vehicle such as a car. The arm pad can be configured as an elongated cushioned member have a curved or "L" shape providing two arms of different widths running on either side of a longitudinal axis of the arm pad such that the arm pad can fit on door sills of varied thickness. If the sill is relatively thick the wide arm of the arm pad is mounted to pad the door sill. Conversely, if the sill is relatively thin, the narrow arm of the arm pad is mounted to pad the door sill.

The structure of the arm pad can include a support portion comprised of an oblong piece of material such as metal, plastic, or reinforced cardboard having a bend running longitudinally that provides the overall curved or "L" shape. In some implementations, the support material is flexible to an extent where an angle between the wide arm and the narrow arm provided by the bend is adjustable A padded layer of foam such as closed cell foam, memory foam, high density foam, or other alternative of similar shape can overlie the support portion. An additional layer of similar shape such as cardboard or similar alternative is contemplated to be mounted to the underside of the support portion to provide added cushion to the mounting of the arm pad to the door sill. One or more layers of vinyl, leather, cloth or similar alternative provide a cover to the arm pad. The arm pad can be attached to the door sill by double-sided tape manufactured by 3M (Maplewood, MN) or similar alternative.

In some implementations, the arm pad is heat flexible and moldable, such that the user can heat the arm pad including the support portion such as by applying a hair drier and then press the arm pad upon the door sill to achieve a more custom fit for a particular car door sill.

Figure 1:
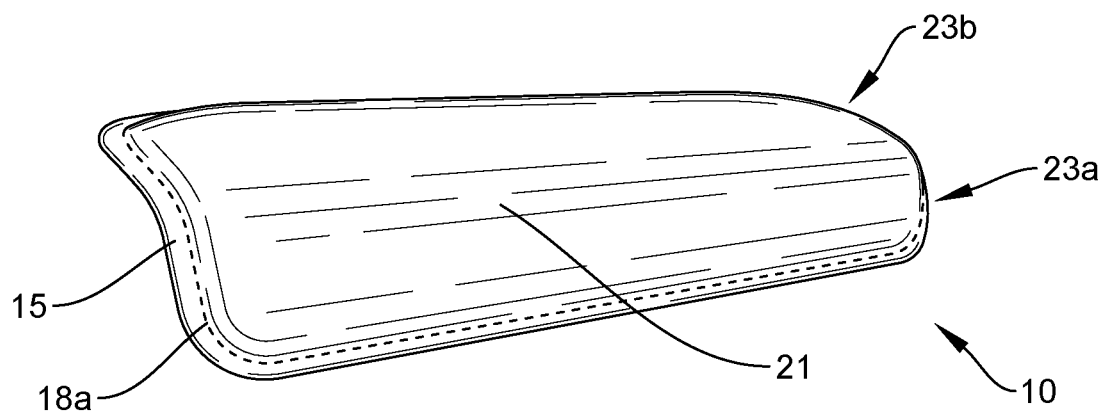
FIGS. 1-7 are diagrams showing an arm pad implementation at various perspective views, where FIG. 1 provides a front, oblique view, FIGS. 2 and 3 provide views from each side of the arm pad, FIG. 4 provides a top view, FIG. 5 provides a bottom view, FIG. 6 provides a front view, and FIG. 7 provides a rear view.
Figure 2:
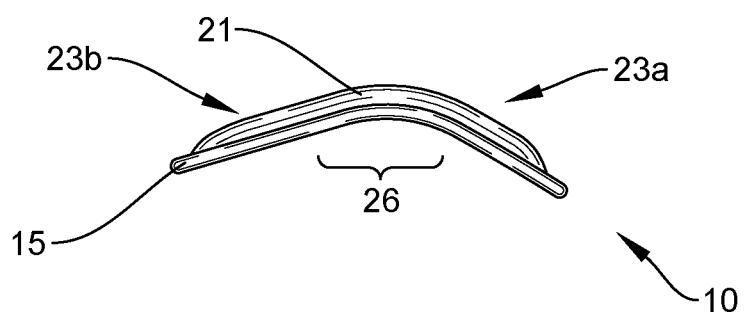
Figure 3:
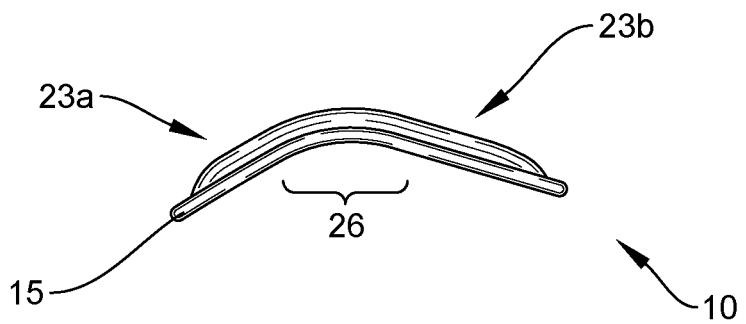
Figure 4:
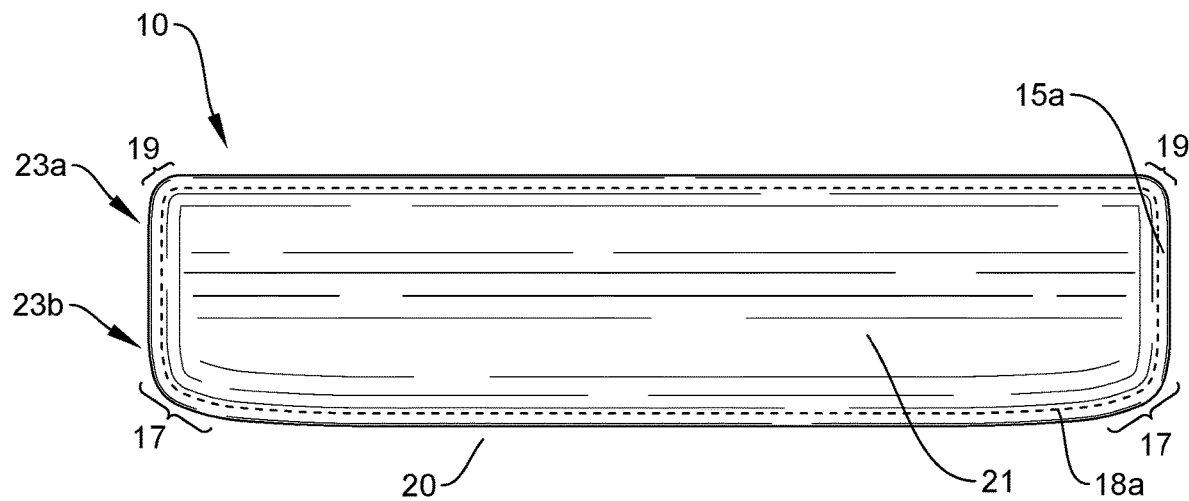
Figure 5:
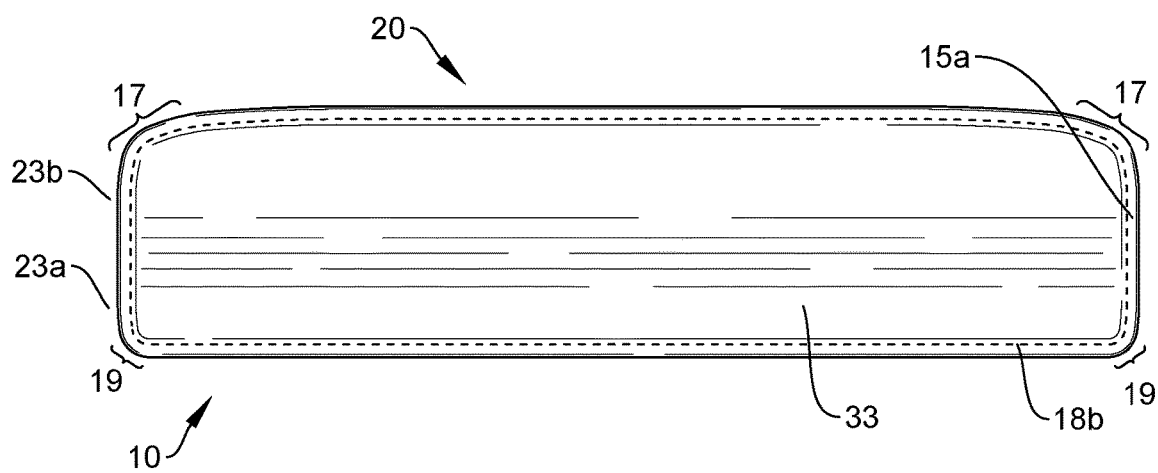
Figure 6:
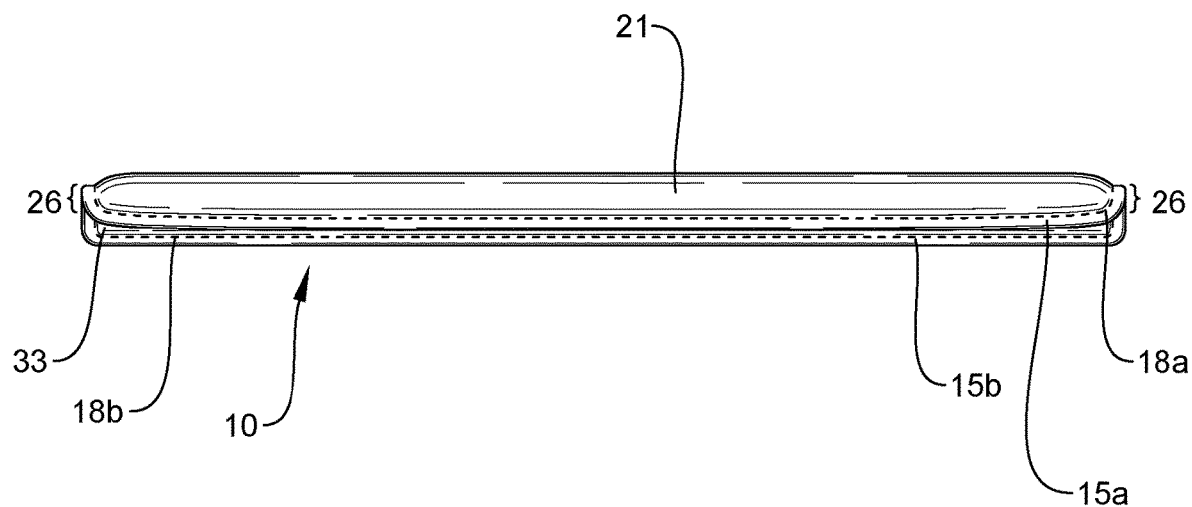
Figure 7:
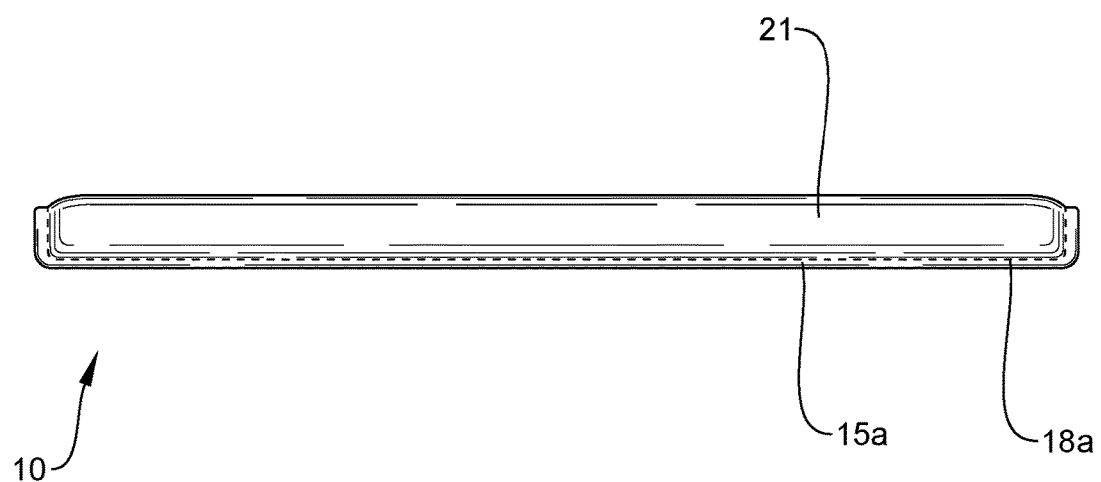
Figure 8:
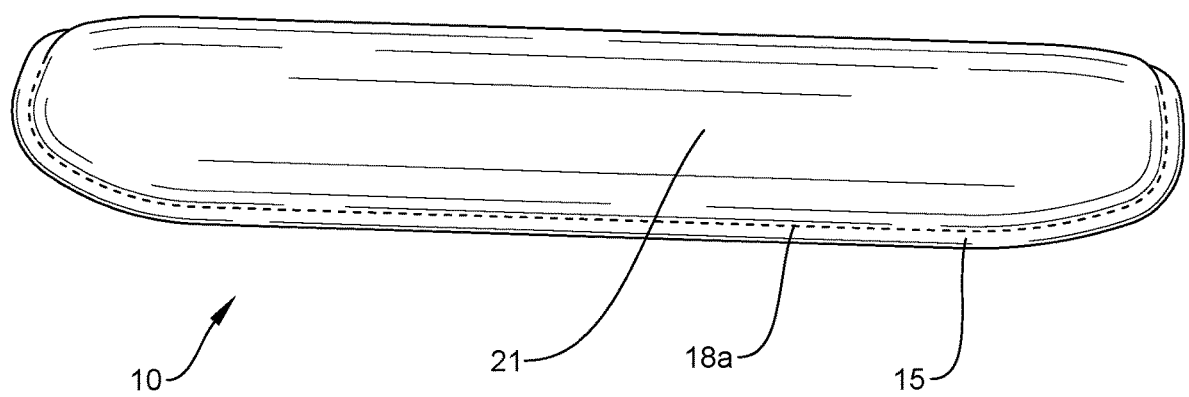
FIGS. 8-13 are images showing an arm pad implementation at various perspective views, where FIG. 8 provides a front, top view, FIG. 9 provides a top, oblique view, FIG. 10 provides a bottom, oblique view, FIG. 11 provides a bottom view, and FIGS. 12 and 13 provide side views.

Turning now to FIGS. 1-7, an arm pad implementation is represented in drawings providing various perspective views. The arm pad 10 includes a padded or cushioned top portion 21 taking up the majority of the top side of the arm pad. The cushioned top portion 21 and bottom portion 33 are bounded by a margin 15 of fabric running along the circumference of the arm pad which is separated from top portion 21 and bottom portion 33 by a top seam 18a and bottom seam 18b running therealong and stitched in a manner which fastens the cover of the arm pad together, as shown in FIGS. 4-5. The arm pad 10 is longitudinally divided by two arms—a narrow arm 23a and wide arm 23b, the latter of which has corner regions 17 which are more widened and broadly curved than opposing corner regions 19 of narrow arm, also shown in FIGS. 4 and 5. The broader corner regions extend to form a lip 20 that projects outward and increases the surface area of the wide arm. An underside, called out in FIG. 5 as 33, is curved at a region near a central longitudinal axis but slightly favoring one side to form an arcuate bend 26 shown in FIGS. 2, 3 and 6, which divides arm pad to form narrow arm 23a and wide arm 23b. The arcuate bend 26 can curve gradually to form an angle between narrow arm 23a and wide arm 23b as shown, or in other implementations, more abruptly including a sharp angle. Wide arm 23b and narrow arm 23a are asymmetrically disposed on either side of arcuate bend 26. The arcuate bend can form an angle between narrow arm 23a and wide arm 23b anywhere from 60 degrees to 175 degrees, including 65, 70, 75, 80, 85, 90, 95, 100, 105, 110, 115, 120, 125, 130, 135, 140, 145, 150, 155, 160, 165, 170 degrees, either in a curved gradual manner as shown or abruptly. Also shown in FIGS. 1-7, a first side of the arm pad comprises a margin 15, a rounded, bulky portion 21, and a seam 18a disposed along an outer edge of the first side between the margin and the rounded, bulky portion 21. FIGS. 4-7 show margin portion includes topside margin 15a and bottom-side margin 15b. The arm pad can have a thickness of around 0.25 cm to around 2.0 cm throughout the rounded bulky portion 21, including 0.3, 0.4, 0.5, 0.6, 0.7, 0.8, 0.9, 1.0, 1.1, 1.2, 1.3, 1.4, 1.5, 1.6, 1.7, 1.8, 1.9 cm thick. The arm pad is thinner around the margin 15. An opposing second side 33 of the arm pad has no rounded, bulky portion, rather it is concave due to arcuate bend 26 running longitudinally. The opposing second side 33 includes margin 15 and seam 18b running along an edge of the arm pad and defining the margin boundary. The bulk of the rounded, bulky portion can be provided by padding material which can contribute to its shape.

Figure 9:
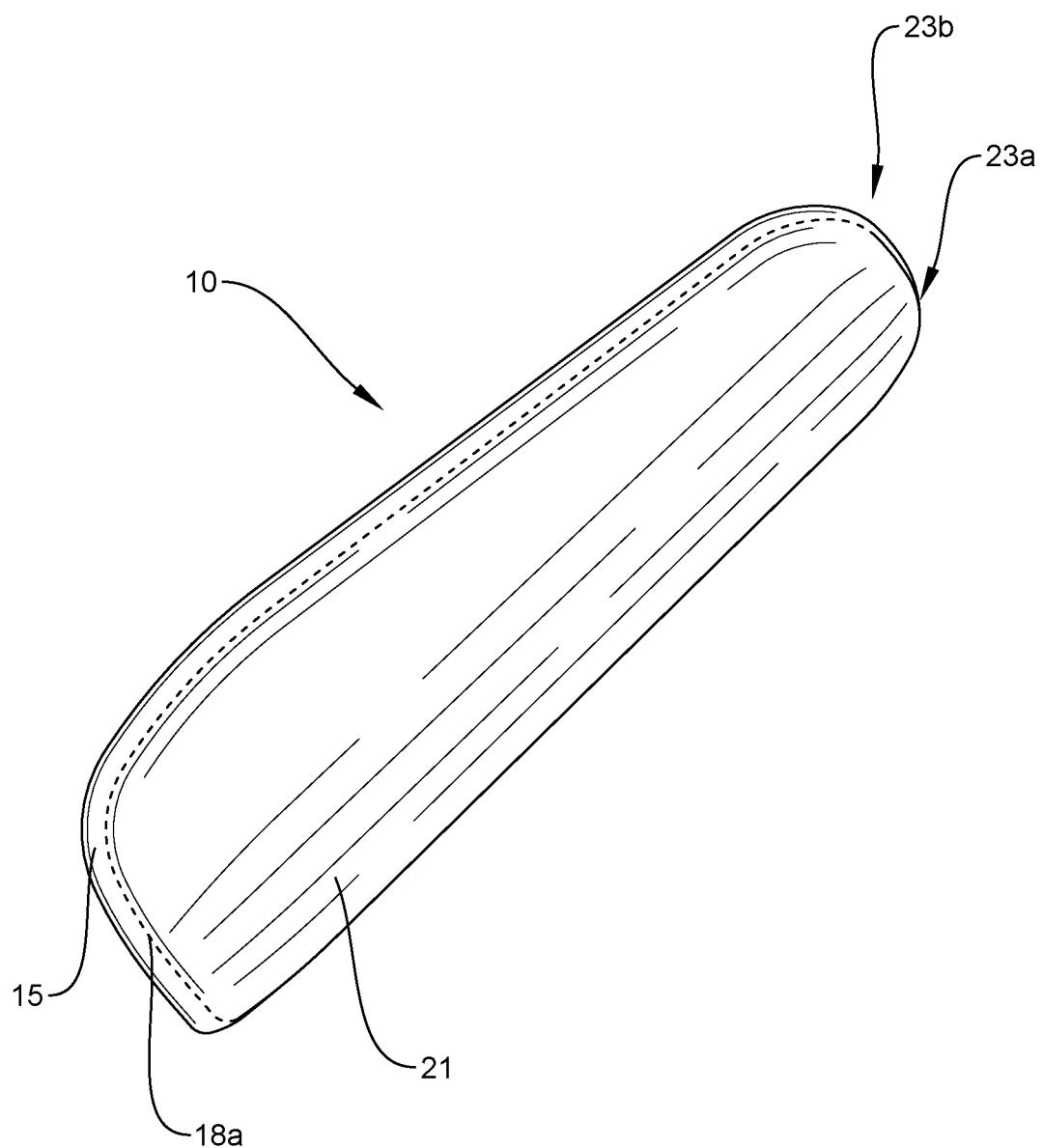
Figure 10:
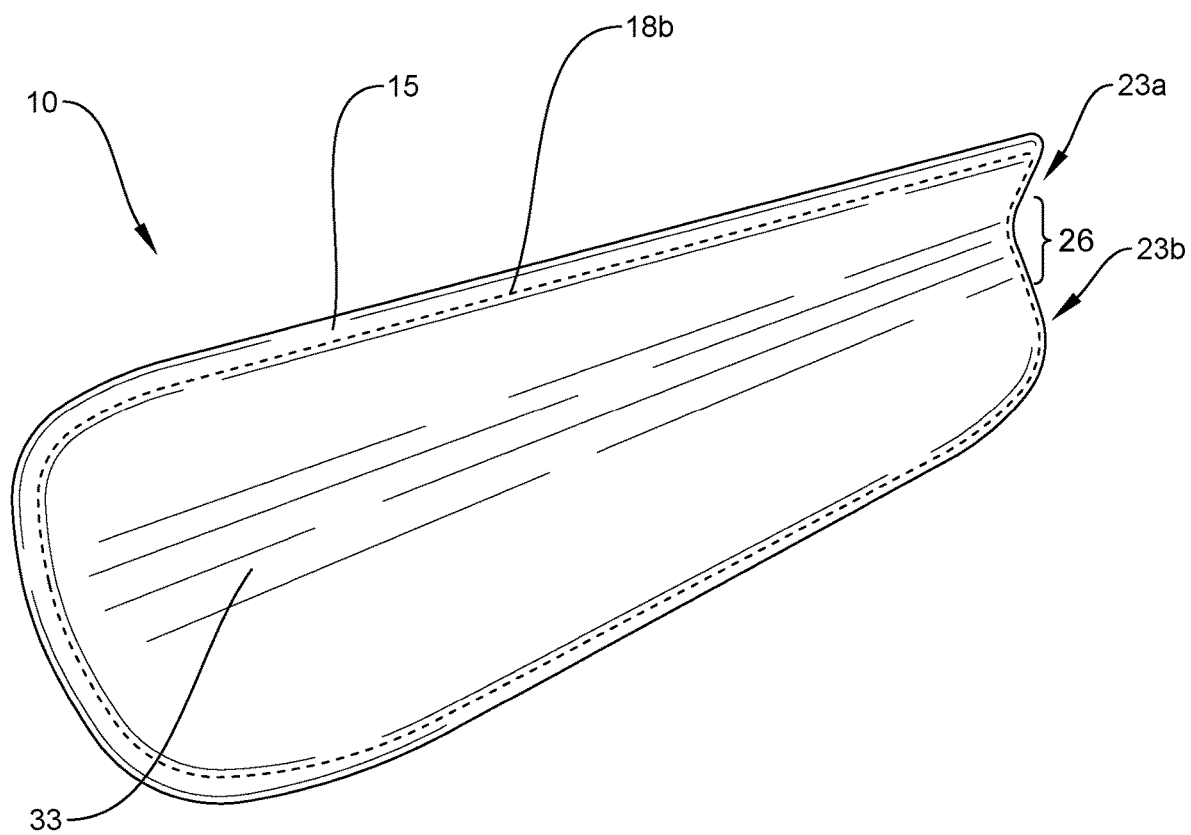
Figure 11:
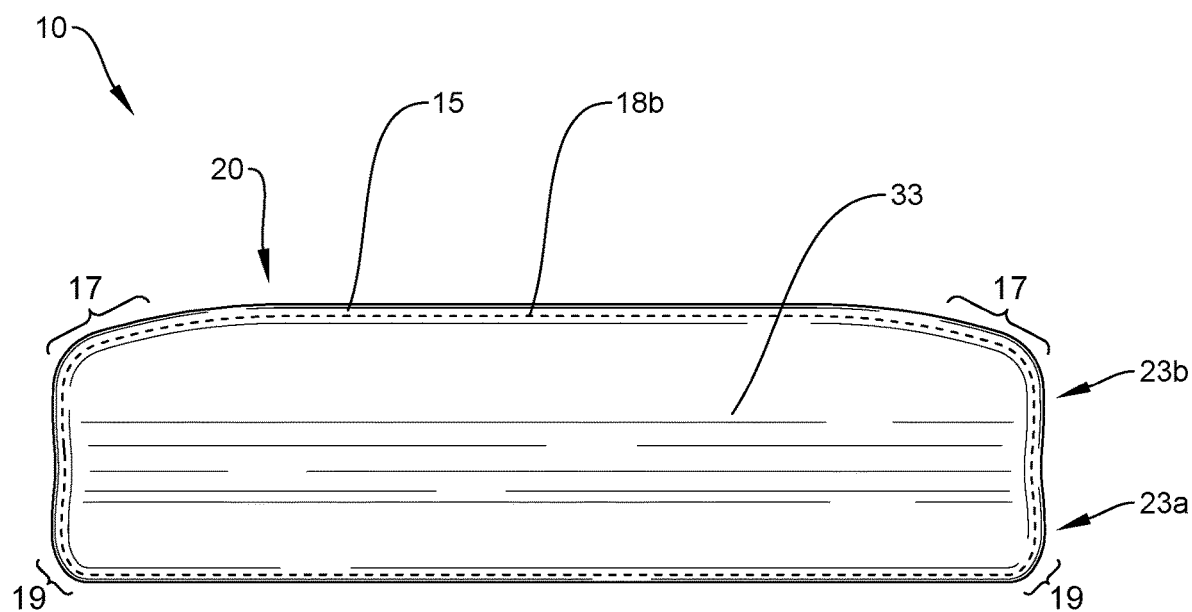
Figure 12:
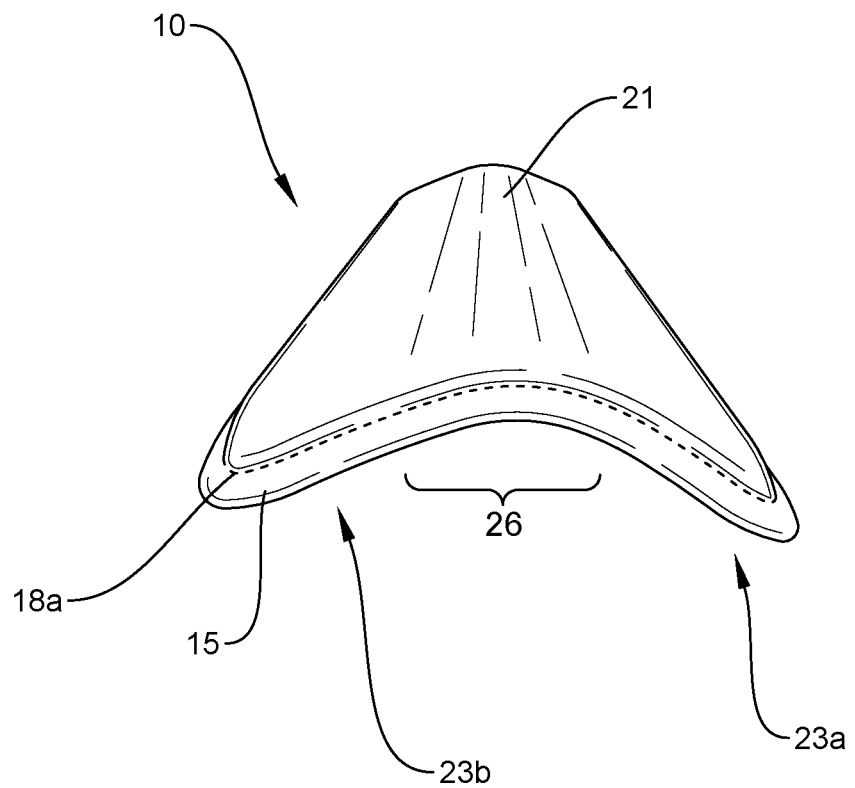
Figure 13:
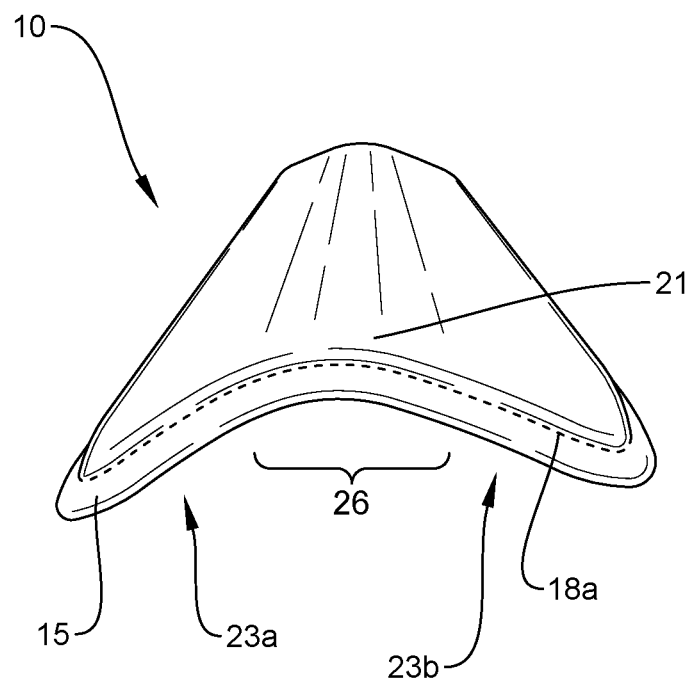

Turning now to FIGS. 8-13, an arm pad implementation is represented in images providing various perspective views. In this instance, the entire arm pad 10 including padded or cushioned top portion 21 and bottom portion 33 are covered with leather, with top seam 18a and bottom seam 18b stitching pieces of the leather cover together on either side of the arm pad, as shown in FIGS. 9-10. However, other suitable materials can be used to cover the arm pad including vinyl or other polymer, natural cloth (e.g., cotton), or synthetic fabric (e.g., polyester). The arcuate bend 26 between narrow arm 23a and wide arm 23b is most clearly visible in FIGS. 10, 12, and 13; FIG. 10 shows side 33 opposing padded or cushioned side 21 has a concave shape due to arcuate bend 26 running longitudinally, while FIG. 12 shows that padded side 21 has a convex shape (see also FIGS. 2 and 3). FIG. 11 shows corner regions 17 of wide arm 23b are widened and more broadly curved than opposing corner regions 19 of narrow arm, the corner regions 17 extending to form lip portion 20 of wide arm 23b.

Figure 14:
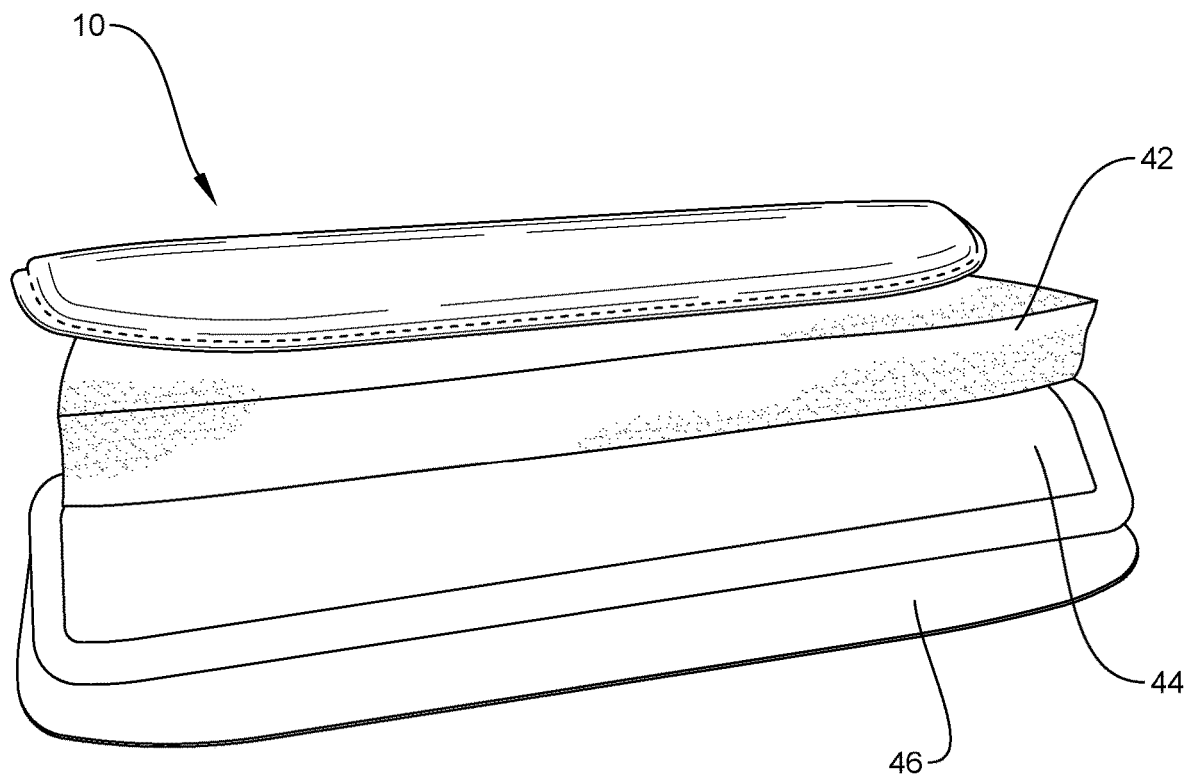
FIG. 14 is an image showing internal layers of an arm pad according to one implementation.

FIG. 14 is an image showing an inner layer construction implementation of an arm pad 10 including foam 42 such as closed cell foam, memory foam, or high-density foam providing bulk of padded or cushioned side of the arm pad, an oblong piece of metal sheet with a longitudinal bend forming a support portion 44, and an additional layer 46 which in this case is cardboard to provide cushioning at the bottom portion of the arm pad. An outer edge of the metal sheet 44 can be bounded with vinyl tape or other polymer to cover sharp portions of the outer edge. The arm pad 10 can be assembled by first creating an outline on the cardboard layer 46 defining the circumference of the arm pad, tracing a boundary over additional layers such as foam 42, metal 44, or cover material, and cutting each layer along the boundary. The top or bottom cover material pieces can be cut to have dimensions somewhat exceeding the dimensions of the other layers to account for extra material required to cover the foam padding 42. The layers can be assembled such that two pieces of cover material sandwich the foam 42, support portion 44, and additional layer 46. The two cover portions can then be stitched together by first 18a and second 18b seam to form the outer margin 15 as shown in previous figures. A top piece of cover material can be slightly greater in dimensions than bottom piece (or vice versa) so that the cover material can overlap and wrap around the outer margin 15 of the arm pad. Arm pad 10 can include multiple layers of each of the materials 42, 44, and/or 46 in some implementations.

Figure 15:
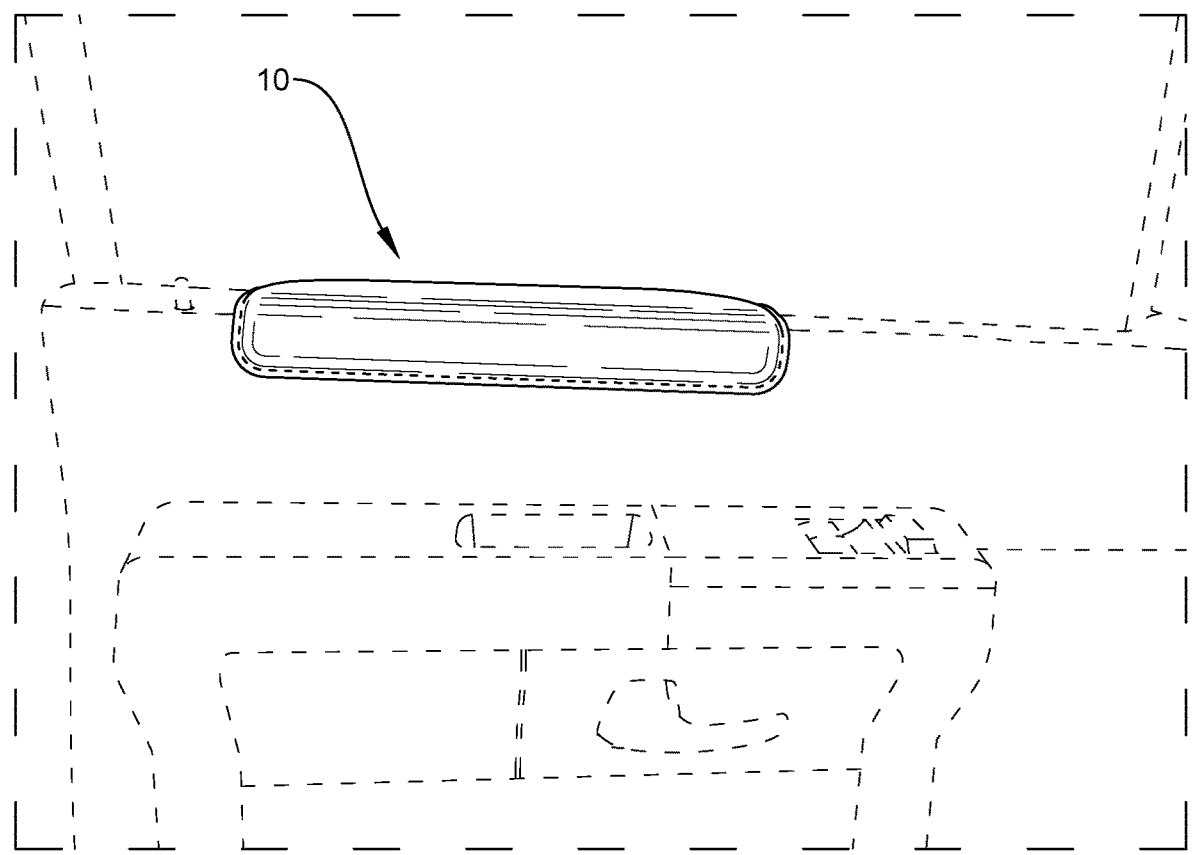
FIGS. 15-18 are images showing an arm pad implementation during use inside a vehicle, where
Figure 16:
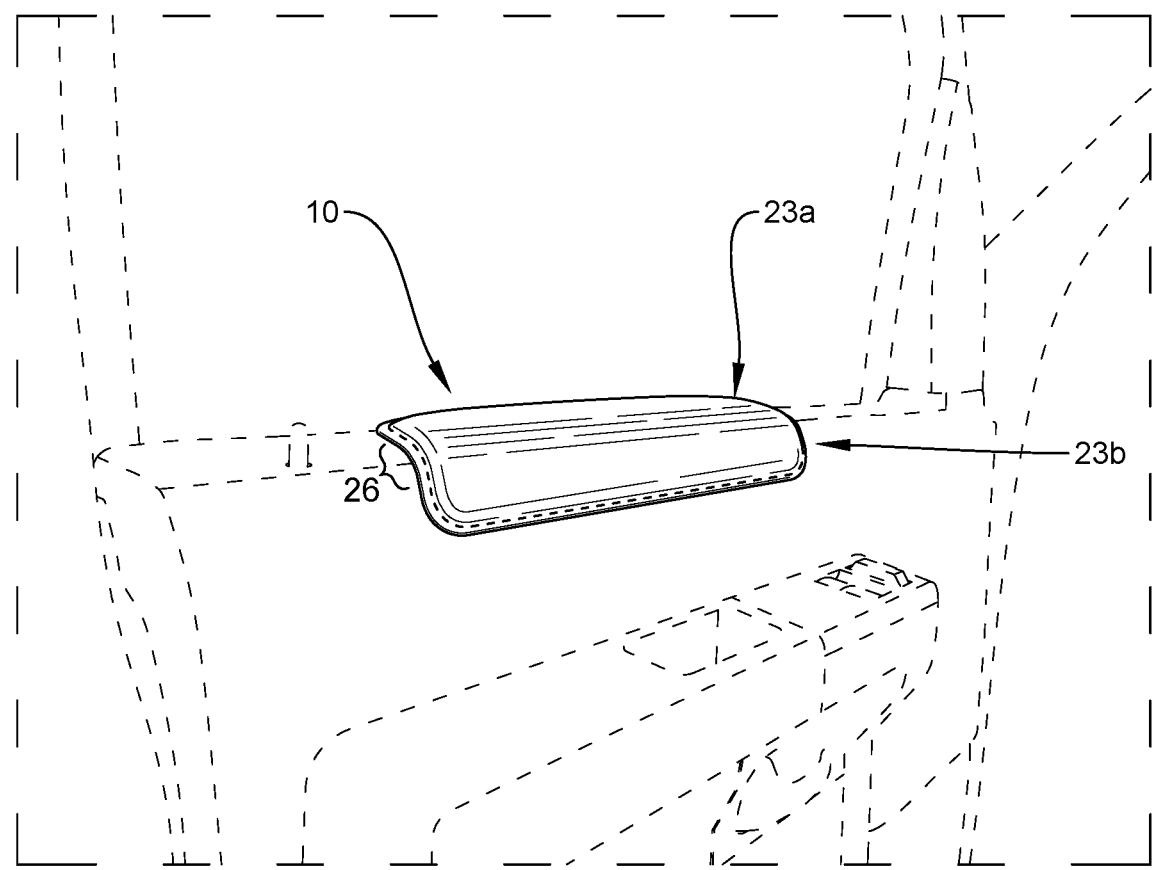
Figure 17:
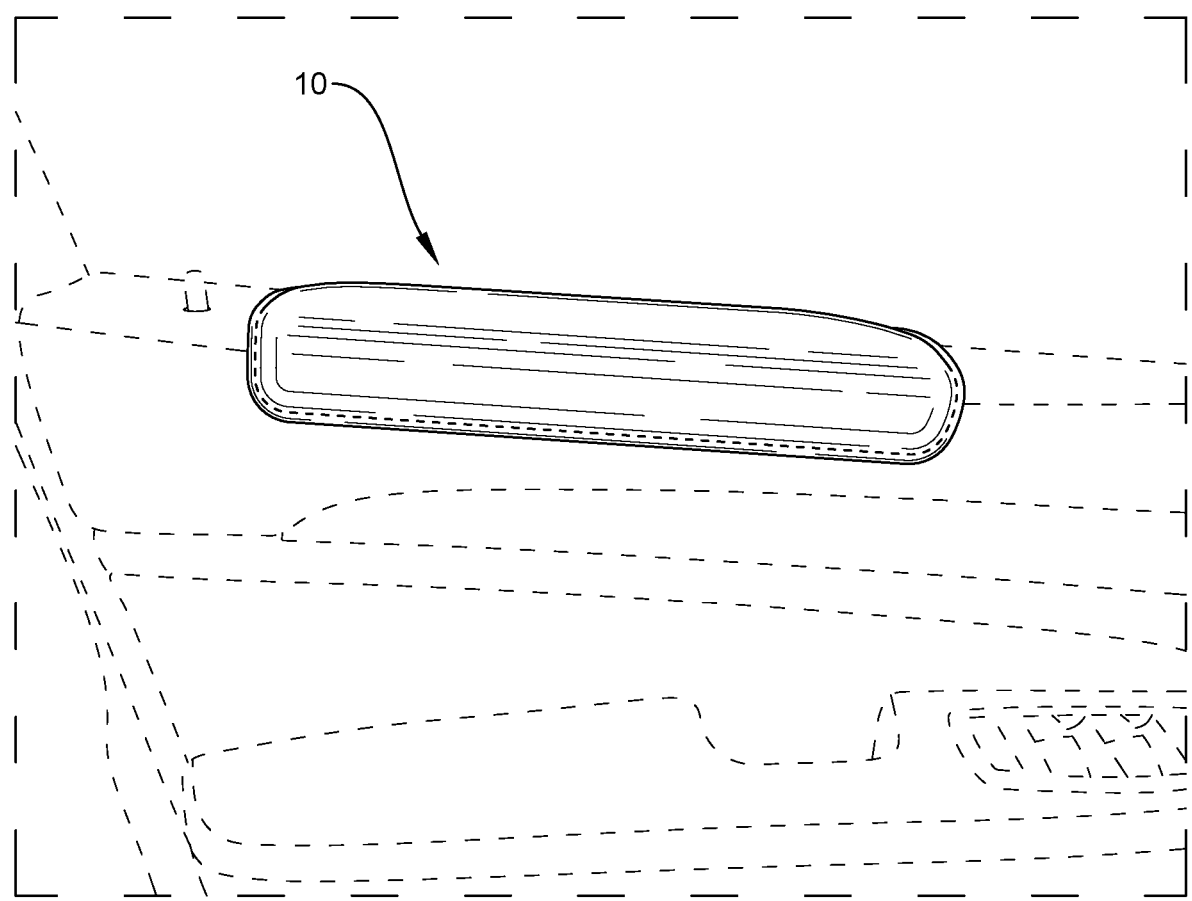
Figure 18:
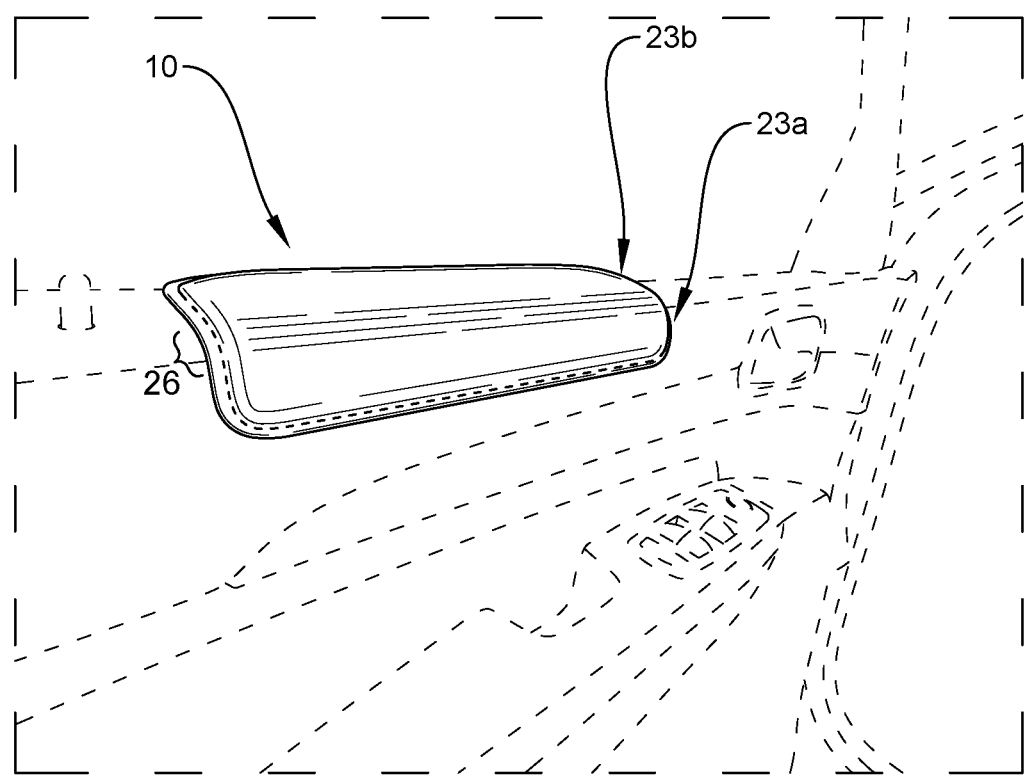

FIGS. 15-18 show an arm pad 10 implementation during use. The arm pad 10 is dimensioned to be mounted on a door sill of a vehicle. FIGS. 15-16 show the arm pad 10 mounted on a narrow sill, with narrow arm 23a positioned at the top of the sill, wide arm 23b positioned along the door side, and arcuate bend 26 spanning the area where the top of the sill and the door side meet. FIGS. 17 and 18 show the arm pad 10 mounted on a wider sill, with wide arm 23b positioned at the top of the sill and narrow arm 23a positioned at the door side, with arcuate bend 26 spanning the area where the top of the sill and the door side meet. The arm pad 10 can be attached to the door sill and side using double-sided adhesive tape or other means, such as hook and loop strips with adhesive backing. While covering of the door sill of the driver's side door with the arm pad 10 is shown in FIGS. 15-18, the arm pad 10 is designed and dimensioned to cover any other door of the vehicle, including front and rear passenger doors. The arm pad 10 can be used so that a driver or passenger can extend and comfortably rest their arm or arm portion such as an elbow on the vehicle door sill next to them during trips.

It should be noted at this point that orientational terms such as top, bottom, front, rear, and sides refer to the subject drawings as viewed by an observer. The drawing figures depict their subject matter in orientations of normal use. Therefore, orientational terms must be understood to provide semantic basis for purposes of description, and do not limit the invention set forth in the claims in any particular way.

The present disclosure has described particular implementations having various features. In light of the disclosure provided above, it will be apparent to those skilled in the art that various modifications and variations can be made without departing from the scope or spirit of the disclosure. For example, the arm pad can be modified to fit over sills present in other transportation settings, including trains, busses, or planes. One skilled in the art will recognize that the disclosed features may be used singularly, in any combination, or omitted based on the requirements and specifications of a given application or design. When an implementation refers to "comprising" or "including" certain features, it is to be understood that the implementations can alternatively "consist of" or "consist essentially of" any one or more of the features. Other implementations will be apparent to those skilled in the art from consideration of the specification and practice of the disclosure.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the disclosure fall within the scope of the disclosure. Further, all of the references cited in this disclosure including patents, published applications, and non-patent literature are each individually incorporated by reference herein in their entireties and as such are intended to provide an efficient way of supplementing the enabling disclosure as well as provide background detailing the level of ordinary skill in the art.

I claim:

1. An arm pad, comprising:
    a first layer of oblong material comprising a support material, the support material having a bend providing an angle or arcuate curve;
    second and third layers of oblong material comprising cushioning material disposed on either side of the support material, wherein the third layer of oblong material is chosen from materials comprising cardboard;
    covering material stitched together to cover the first, second, and third layers of oblong material;
    wherein the bend of the support material runs longitudinally and off-center to provide a wide arm and a narrow arm disposed on either side of the bend;
    wherein the bend, wide arm, and narrow arm are dimensioned to fit over a door sill of a vehicle.

2. The arm pad of claim 1, wherein the first layer of oblong material is chosen from materials comprising metal, plastic, and reinforced cardboard.

3. The arm pad of claim 1, wherein the second layer of oblong material is chosen from foam materials comprising closed cell foam, memory foam, and high-density foam.

4. The arm pad of claim 1, wherein the covering material is stitched together at a first seam and a second seam at a margin on an outer edge of the arm pad along a first and second side of the arm pad.

5. The arm pad of claim 1, wherein the wide arm has corner regions which are more widened and broadly curved than opposing corner regions of the narrow arm.

6. The arm pad of claim 1, wherein the covering material is chosen from materials comprising leather, vinyl, and cloth.

7. The arm pad of claim 1, wherein the bend forms an angle between the narrow arm and the wide arm in the range of 60 degrees to 175 degrees.

8. The arm pad of claim 1, wherein the arm pad is dimensioned to mount on a vehicle door sill such that the narrow arm can extend over a narrow door sill and the wide arm can extend over a door side, and the bend can span an area where the narrow door sill and door side meet.

9. The arm pad of claim 1, wherein the arm pad is dimensioned to mount on a vehicle door sill such that the wide arm can extend over a wide door sill and the narrow arm can extend over a door side, and the bend can span an area where the wide door sill and door side meet.

10. The arm pad of claim 1, wherein the arm pad is flexible such that an angle provided by the bend of the support material is adjustable.

11. An arm pad, comprising:
    a first layer of oblong material comprising a support material, the support material having a bend providing an angle or arcuate curve;
    second and third layers of oblong material comprising cushioning material disposed on either side of the support material;
    covering material stitched together to cover the first, second, and third layers of oblong material;
    wherein the bend of the support material runs longitudinally and off-center to provide a wide arm and a narrow arm disposed on either side of the bend;
    wherein the bend, wide arm, and narrow arm are dimensioned to fit over a door sill of a vehicle,
    wherein a first side of the arm pad comprises a margin, a rounded, bulky portion, and a seam disposed along an outer edge of the first side between the margin and the rounded, bulky portion, and an opposing second side of the arm pad has no rounded, bulky portion.

12. The arm pad of claim 11, wherein the second layer of oblong material provides bulk to the rounded, bulky portion, and the second layer of oblong material is a foam.

13. The arm pad of claim 11, wherein the opposing second side of the arm pad comprises a margin formed by a seam disposed along an outer edge of the opposing second side of the arm pad.

14. An arm pad, comprising:
    a first layer of oblong material comprising a support material, the support material having a bend providing an angle or arcuate curve;
    second and third layers of oblong material comprising cushioning material disposed on either side of the support material;
    covering material stitched together to cover the first, second, and third layers of oblong material;
    wherein the bend of the support material runs longitudinally and off-center to provide a wide arm and a narrow arm disposed on either side of the bend;
    wherein the bend, wide arm, and narrow arm are dimensioned to fit over a door sill of a vehicle,
        wherein the arm pad is flexible and moldable when heated such that pressing the arm pad against a vehicle door sill when heated provides a custom fit for mounting the arm pad on a vehicle door sill.

15. An arm pad, comprising:
    a first layer of oblong material comprising a support material, the support material having a bend at an angle or arcuate curve;

second and third layers of oblong material comprising cushioning material disposed on either side of the support material; and covering material stitched together to cover the first, second, and third layers of oblong material;

wherein the bend of the support material runs longitudinally and off-center to provide a wide arm and a narrow arm disposed on either side of the bend;

wherein the first layer of oblong material is chosen from materials comprising metal, plastic, and reinforced cardboard;

wherein the second layer of oblong material is chosen from foam materials comprising closed cell foam, memory foam, and high-density foam;

wherein the third layer of oblong material is chosen from materials comprising cardboard;

wherein the covering material is chosen from materials comprising leather, vinyl, and cloth;

wherein the covering material is stitched together at a first seam and a second seam at a margin on an outer edge of the arm pad along a first and second side of the arm pad;

wherein the bend forms an angle between the narrow arm and the wide arm in the range of 60 degrees to 175 degrees; and wherein the arm pad is dimensioned to mount on a vehicle door sill such that the narrow or wide arm can extend over the door sill and an opposing arm can extend over the door side, and the bend can span an area where the door sill and door side meet.

16. The arm pad of claim 15, wherein a first side of the arm pad comprises a margin and a rounded, bulky portion, and the first or second seam is disposed along an outer edge of the first side between the margin and the rounded, bulky portion, and an opposing second side of the arm pad has no rounded, bulky portion.

17. The arm pad of claim 16, wherein the second layer of oblong material provides bulk to the rounded, bulky portion.

18. The arm pad of claim 16, wherein the first side of the arm pad is concave and the second side of the arm pad is convex.

19. The arm pad of claim 15, wherein the wide arm and a narrow arm are disposed asymmetrically on either side of the bend.

* * * * *